United States Patent [19]

Sugimori et al.

[11] Patent Number: 4,752,522

[45] Date of Patent: Jun. 21, 1988

[54] ELECTROSTATIC RECORDING MATERIAL

[75] Inventors: Teruhiko Sugimori; Fumio Suzuki, both of Otake; Naoyuki Fukabori, Ayase; Hideaki Habara, Otake, all of Japan

[73] Assignee: Mitsubishi Rayon Company Limited, Tokyo, Japan

[21] Appl. No.: 847,525

[22] Filed: Apr. 3, 1986

[30] Foreign Application Priority Data

Apr. 26, 1985 [JP] Japan .................................. 60-90542

[51] Int. Cl.⁴ .......................... B32B 3/00; B32B 5/16; D21F 11/00

[52] U.S. Cl. .................................... 428/211; 428/323; 428/511; 428/512; 428/513; 428/514; 427/121; 427/261; 346/135.1; 162/138

[58] Field of Search ................ 428/323, 211, 511-514, 428/537; 346/135.1; 427/261, 121; 162/138

[56] References Cited

U.S. PATENT DOCUMENTS 3,097,964 7/1963 Stowell .
4,542,059 9/1985 Toganoh et al. .................... 428/141

*Primary Examiner*—John E. Kittle
*Assistant Examiner*—Patrica J. Ryan
*Attorney, Agent, or Firm*—Oblon, Fisher, Spivak, McClelland & Maier

[57] ABSTRACT

An electrostatic recording material comprising a substrate treated for low electric resistance and a dielectric layer formed on the substrate and composed of a composition comprising an insulating resin having a volume specific resistance of at least $10^{12}\Omega$cm and a powder of an acrylonitrile-type polymer having a copolymerized acrylonitrile content of at least 95% by weight and containing substantially no ionic groups, said powder having a volume average particle size of from 1.5 to 4 $\mu$m and a content of particles having a size exceeding 8 $\mu$m as measured by a particle size distribution measuring apparatus, being at most 0.02% by number.

14 Claims, 4 Drawing Sheets

ELECTROSTATIC RECORDING MATERIAL

The present invention relates to an electrostatic recording material which provides excellent reproducibility of fine or minute images when used for facsimile, high-speed printing or electrostatic copying and, in particular, to an electrostatic recording material which is capable of presenting a clear drawing with a high image density without breakage of fine line images when a drawing drafted by a CAD system is drawn on the electrostatic recording paper by means of an electrostatic plotter.

An electrostatic recording method comprises applying an electric charge to a recording material comprising a substrate treated for low electric resistance and a recording layer of a highly dielectric resin, to form an electrostatic latent image, and then developing this electrostatic latent image with a toner to form a visible recording image.

In recent years, there have been remarkable developments in the technology of a CAD system for designing various objects by means of computers, and such a system is being developed for application in various fields. Especially for the preparation of a large size detailed drawing of a size A3 or larger, the CAD system is effective in that it is thereby possible to draft a more accurate drawing at a higher speed than the manual drafting. However, in the conventional CAD system, an X-Y plotter is used for drafting a drawing with a single writing means, whereby it takes a few hours for drafting a drawing of a size A3 and at least about 10 hours for drafting a drawing of a size A0. A study is being made to develop a plotting method whereby the merit of the CAD system is adequately utilized for drafting a drawing. It has been found possible to shorten the time required for drafting a drawing to a level of not longer than 30 minutes by employing an electrostatic plotter system in which multi-needle recording electrodes are used for drafting a drawing on an electrostatic recording material.

High performance electrostatic recording materials useful for the above-mentioned electrostatic plotter system, have been developed wherein the highly dielectric recording layer is made of an organic resin such as a polystyrene, a polyvinyl chloride, a polymethyl methacrylate or an epoxy resin. However, these electrostatic recording materials have difficulties such that the surface smoothness is so high that not only the electrostatic image-forming properties are inadequate, but also the light reflectance is so high that it is difficult to read the images with naked eyes, and the writability and stamp ink receptivity are also inadequate. Thus, they do not adequately satisfy the properties required for electrostatic recording materials useful for the electrostatic plotter system.

Further, an electrostatic recording material has been developed wherein the highly dielectric recording layer is made of a composition comprising the above-mentioned insulating organic resin and an inorganic filler such as calcium carbonate, titanium oxide or clay. This electrostatic recording medium has a roughened surface, whereby the writability and stamp ink receptivity are good. However the inorganic filler contained in the highly dielectric recording layer is a hydrophilic substance, whereby the electric charge applied to the recording layer is likely to leak, and the electrostatic image-forming properties are poor. Thus, it is not fully satisfactory as an electrostatic recording material for the electrostatic plotter system.

U.S. Pat. No. 3,097,964 discloses an electrostatic recording material in which a coating film of a crotonic acid-vinyl acetate copolymer containing fine particles of a styrene-α-methylstyrene copolymer having a particle size of at most 1 μm in a partially embedded state, is provided as a dielectric layer on a sheet of paper. Since the dielectric layer of this electrostatic recording material contains styrene-α-methylstyrene copolymer particles having a particle size of at most 1 μm, the writability is good. However, it is difficult to electrically charge it to a high level by an application of electric charge. Thus, it does not have adequate properties as an electrostatic recording material for forming a clear electrostatic image with a high image density.

Japanese Unexamined Patent Publication No. 110254/1980 discloses an electrostatic recording material wherein the dielectric layer is made of a composition comprising an organic resin and acrylonitrile-type polymer particles having a particle size of at most 10 μm. This recording material is capable of recording an electrostatic recording image having a higher image density than that obtainable by conventional recording materials. However, it has a difficulty that breakage of an image is likely to occur, and in particular, the fine line image-forming properties with 8 dots/mm or higher are extremely poor.

The dielectric layer of an electrostatic recording material is required to satisfy the following conditions.

(1) The dielectric layer should be charged to a high level when an electrostatic charge is applied to the layer, and the leak of the electric charge with time is minimum.

(2) When contacted with a recording electrode, it will not give a damage such as abrasion to the recording electrode.

(3) When an electrostatic latent image formed on the dielectric layer is developed with a toner, it presents a good property for the formation of a fine line image, and it is free from fogging or blurring.

(4) The dielectric layer has paper-like whiteness and has excellent writability when written with a writing means such as a pencil, a fountain pen or a ball point pen.

When the invention of U.S. Pat. No. 3,097,964 is considered from the above viewpoints, it is evident that the dielectric layer made of the crotonic acid-vinyl acetate copolymer film with a styrene-α-methylstyrene copolymer powder of a particle size of at most 1 μm embedded therein, has relatively good writability with a pencil or a ball point pen, but the electric chargeability when an electrostatic charge is applied to the dielectric layer, is inadequate, whereby the image density is low, the resolution is poor, and the properties for the formation of fine line images are inadequate. Further, since the powder used is a styrene-α-methylstyrene copolymer, it is difficult to obtain a dielectric layer having paper-like whiteness, and the absorption of an ink is poor and the image tends to be blurred. Therefore, it is desired to develop an electrostatic recording material having these points improved.

The electrostatic recording material disclosed in Japanese Unexamined Patent Publication No. 110254/1980 has paper-like whiteness and good writability with a pencil, a ball point pen or a fountain pen, and the chargeability of the dielectric layer with an electrostatic charge is relatively good. However, the electrostatic charge is likely to leak, and there is an additional drawback that the dielectric layer is likely to have portions where the electric chargeability by an electrostatic charge is poor, and when developed with a toner, breakage of fine line images as shown at numeral 5 in FIG. 2 is likely to result, and fogging is likely to be led when developed with a toner.

The real reason for these difficulties is not clearly understood, but it is believed that the difficulties are somewhat attributable to the fact that the average particle size of the acrylonitrile-type polymer particles contained in the dielectric layer of this electrostatic recording paper, exceeds 6 μm and is usually about 8 μm, and the content of particles having a size exceeding 8 μm is high at a level of more than 1%.

Japanese Examined Patent Publication No. 31732/1982 discloses a process for producing fine spherical particles of an acrylonitrile-type polymer having a particle size of from 1 to 2000 μm. According to this reference, at most 92% by weight of acrylonitrile and other comonomer are polymerized in an aqueous medium having a cation concentration of from 0.03 to 3 gram ion/liter $H_2O$ at 120° C. under stirring at a high speed under a condition such that the polymer resulting in the polymerization system forms molten oily drops, and then cooled to obtain a acrylonitrile-type polymer containing at least $2\times10^{-5}$ mol/g (polymer) of sulfonic acid groups or their salt and having a particle size of from 1 to 2000 μm. If an attempt is made to obtain a polymer containing at least 92% by weight of the acrylonitrile in the acrylonitrile-type polymer obtained according to this method, it becomes difficult to form the polymer resulting in the polymerization step in the form of molten oily drops, and it becomes difficult to obtain a powder having a controlled particle size.

Further, the fine powder to be incorporated into the dielectric layer of the electrostatic recording material is required to have a high insulating property and high dielectric property, and excellent whiteness. From this viewpoint, the polymer having a copolymerized acrylonitrile content of at most 92% by weight, has drawbacks that the dielectric properties are inadequate and the whiteness is likewise inadequate.

Thus, an electrostatic recording material provided with a highly dielectric layer containing the acrylonitrile-type polymer powder prepared by this method, can not have a high image density, a good resolution and adequate clear image-forming properties.

The present inventors have conducted extensive researches to obtain an electrostatic recording material capable of forming fine clear electrostatic images, and have found that the filler dispersed in the highly dielectric recording layer governs the important properties, and in particular, that the object of the present invention can be attained by choosing a filler which satisfies the following conditions:

(a) the average particle size is within a specified range, and the content of large particles is not more than a specific level;

(b) the organic polymer particles constituting the filler have low hydrophilic properties and excellent dielectric characteristics; and (c) the fixing properties of a toner are good, and the developing properties for fine line latent images are good. The present invention has been accomplished on this basis.

The present invention provides an electrostatic recording material comprising a substrate treated for low electric resistance and a dielectric layer formed on the substrate and composed of a composition comprising a insulating resin having a volume specific resistance of at least $10^{12}$ Ωcm and a powder of an acrylonitrile-type polymer having a copolymerized acrylonitrile content of at least 95% by weight and containing substantially no ionic groups, said powder having a volume average particle size of from 1.5 to 4 μm and a content of particles having a size exceeding 8 μm as measured by a particle size distribution measuring apparatus, being at mos 0.02% by number.

Now, the present invention will be described in detail with reference to the preferred embodiments.

In the accompanying drawings, FIG. 1(*a*) is a diagrammatic illustration of the cross-sectional structure of an electrostatic recording material of the present invention.

BRIEF DESCRIPTION OF DRAWINGS

FIG. 5(*b*) is an enlarged microscopic photograph of an organic fine powder to be used in the present invention.

Figure 1:
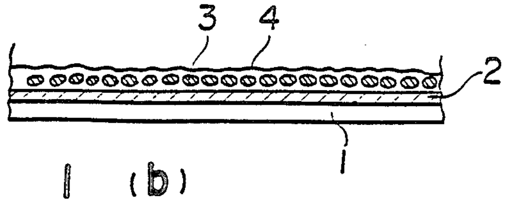
FIG. 1(*b*) is a diagrammatic illustration of the cross-sectional structure of an electrostatic recording material outside the scope of the present invention.
Figure 1:
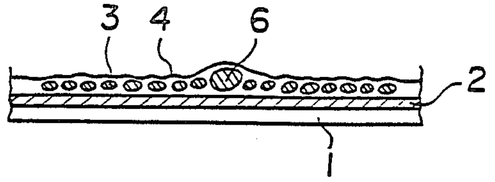

In these Figures, reference numeral 1 designates a substrate, numeral 2 designates a layer treated for low electric resistance, numeral 3 designates an acrylonitrile-type polymer powder, numeral 4 designates a highly dielectric layer, numeral 5 indicates the portion where the fine line image is broken, numeral 6 designates a particle having a large particle size outside the scope of the present invention, numeral 7 designates a polymer particle, numeral 8 designates an inlet of the air jet of the apparatus for the production of an organic powder, numeral 9 designates a powder pulverization zone, and numeral 10 designates an inlet for the supply of the starting material polymer particles.

The acrylonitrile-type polymer to be used for the preparation of the fine particles of the acrylonitrile-type polymer to be used in the present invention, preferably has a polymerized acrylonitrile content of from 95 to 100% by weight, contains substantially no ionic groups and has a reduced viscosity of from 1 to 8 (a value calculated by measuring the viscosity of a dimethylformamide solution having a polymer concentration of 0.5% by weight at 25° C.) representing the molecular weight of the acrylonitrile-type polymer.

If the polymerized acrylonitrile content is less than 95% by weight, the dielectric properties of the acrylonitrile-type polymer will not be satisfactory, and such a polymer does not satisfy the requirements for an acrylonitrile-type polymer powder useful for the formation of a highly dielectric layer. The acrylonitrile-type polymer having such a composition is soft as compared with the acrylonitrile-type polymer used in the present invention, and forms a powder having difficulties such that the powder particles are likely to undergo coagulation, and the coagulated powder particles are hardly separable. Further, the powder having such a composition tends to have a low hardness, and fail in the properties required for a powder for forming an electrostatic recording material.

The acrylonitrile-type polymer constituting the powder to be used in the present invention preferably contains at most $5\times10^{-5}$ mol/g (polymer), more preferably at most $2\times10^{-5}$ mol/g (polymer), of ionic groups represented by sulfonic acid groups or their salts. If the acrylonitrile-type polymer contains a large amount of ionic groups, the hydrophilic nature increases, and a recording material having a dielectric layer containing such acrylonitrile-type polymer particles can hardly be made to have a dielectric layer having a high level of dielectric constant, whereby it is impossible to form a clear electrostatic recording image having a high image density and resolution.

The reduced viscosity of the acrylonitrile-type polymer to be used in the present invention is preferably within a range of from 1 to 8. If the reduced viscosity is less than 1, the acrylonitrile-type polymer tends to be brittle and will not have adequate properties as a filler. On the other hand, if the reduced viscosity exceeds 8, it will be difficult to pulverize the resulting acrylonitrile-type polymer into fine particles having a volume average particle size of from 1.5 to 4 μm.

The acrylonitrile-type polymer having the above-mentioned properties, can be prepared by emulsion polymerization, suspension polymerization or a polymerization method disclosed in Japanese Patent Applications Nos. 133552/1984 and 133553/1984.

FIG. 1(*a*) shows an enlarged view of the cross-sectional structure of an electrostatic recording material of the present invention. In FIG. 1(*a*), reference numeral 1 designates a substrate, numeral 2 designates a layer treated for low electric resistance, numeral 3 designates an acrylonitrile-type polymer powder particle, and numeral 4 designates a highly dielectric layer. If an electric charge is applied to the dielectric layer of an electrostatic recording material having a roughened surface structure as shown in FIG. 1, the electric charge will be concentrated to a highly dielectric portion where protrusions are formed by the acrylonitrile-type polymer particles, and the charged portions constitute image-forming portions. The greater the number of the image-forming charged portions per unit area, the better the properties. However, when an acrylonitrile-type polymer having an average particle size which makes the number of such portions greater than 500,000/mm² in an average is employed, the image forming properties deteriorate abruptly. Therefore, it is believed that in the dielectric layer wherein a acrylonitrile-type polymer powder having an average particle size being extremely small, the formation of the surface roughness as shown in FIG. 1(*a*) is impaired. Thus, the writability of this recording material tends to be poor, and at the same time, when brought in contact with a recording electrode, such a recording material tends to give a damage such as abrasion to the electrode.

From the above viewpoint, the acrylonitrile-type polymer powder to be used in the present invention is required to have a volume average particle size of from 1.5 to 4 μm. In a dielectric layer of an electrostatic recording material prepared from an acrylonitrile-type polymer powder having a large volume average particle size exceeding 6 μm and an organic resin which has been heretofore developed, the number of the above-mentioned charged portions is believed to be less than 100,000/mm², and its cross-sectional shape tends to show irregular coarse surface roughness. It is believed that this is attributable to the deterioration of the uniform charge properties of the dielectric layer and to the hindrance to the formation of fine sharp electrostatic images.

The present inventors have made a study to obtain an electrostatic recording material free from the above-mentioned drawbacks, and as a result, succeeded in achieving the object by employing an acrylonitrile-type polymer powder having a volume average particle size of from 1.5 to 4 μm and a content of particles having a particle size exceeding 8 μm, particularly 6 μm, being at most 0.02% by number.

Figure 2:
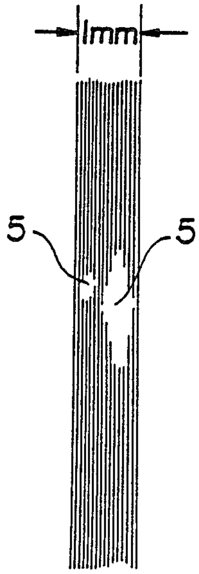
FIG. 2 is an example of a fine line image recording by an electrostatic recording member outside the scope of the present invention.
Figure 3:
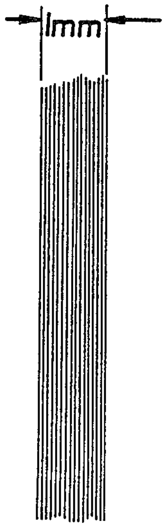
FIG. 3 is a fine line image recording by an electrostatic recording medium of the present invention.

Further, in a case where an especially high line density is required, it is possible to obtain an electrostatic recording material capable of forming clear images having a high image density and good resolution as shown in FIG. 3 and substantially free from breakage of the fine line images as shown at 5 in FIG. 2 by making the electrostatic recording material with use of a powder having a content of particles having a particle size exceeding 10 μm as measured by a particle size distribution measuring apparatus (Coulter Counter® Model TAII, aperture diameter: 50 μm, manufactured by Coulter Electronics, Inc.) being at most 30 particles per 500,000 particles counted that is, at most 0.006% by number, as the acrylonitrile-type polymer powder having the above-mentioned properties. The reason for this is not clearly understood. However, it is believed that an electrostatic recording material prepared by employing an acrylonitrile-type polymer powder containing particles having a large particle size, will have a cross-sectional structure as shown in FIG. 1(*b*), and the vicinity of an acrylonitrile-type polymer particle 6 having a large particle size will have a protruded structure wider in the surface area than other portions, whereby the charge characteristics at such a portion will be poor as compared with other portions containing particles having smaller particle sizes, and the electric chargeability at such a portion is poor, thus resulting in an electrostatic recording material causing breakage of fine line images as shown at 5 in FIG. 2.

The acrylonitrile-type polymer powder to be used in the present invention may be prepared, for instance, by the following method.

Figure 4:
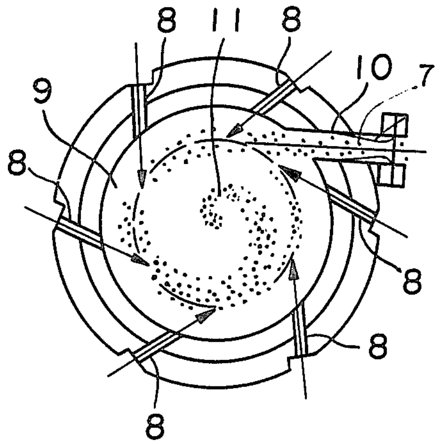
FIG. 4 is a diagrammatic cross-sectional view of an apparatus for the preparation of an organic powder to be used in the present invention.
Figure 5A:
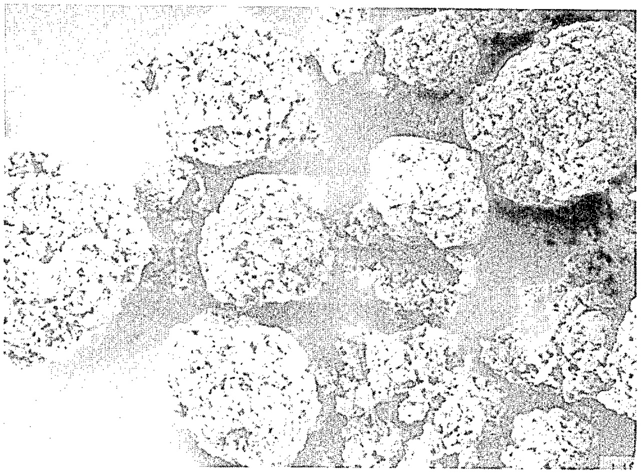
FIG. 5(*a*) is an enlarged microscopic photograph of an AN type polymer powder as the starting material obtained by suspension polymerization.
Figure 5B:
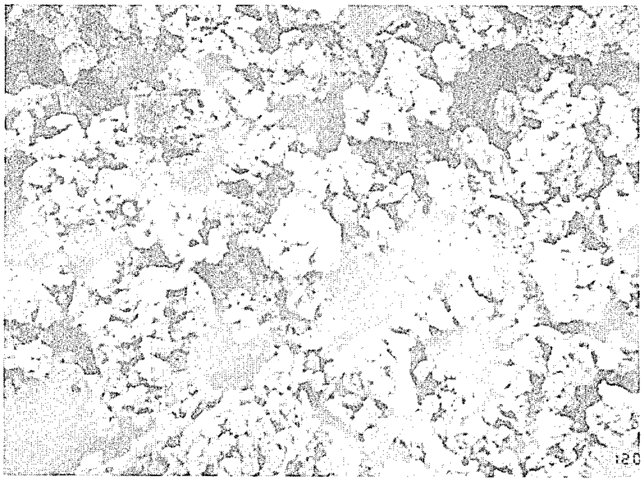

Referring to FIG. 4, porous polymer particles 7 obtained by suspension polymerization and having a volume average particle size of from 20 to 40 μm as shown in FIG. 5(*a*) formed by agglomeration of primary polymer particles having a particle size of from 0.1 to 2 μm, are supplied from an particle supply inlet to a powder pulverization zone 9, and a gas is supplied from an air jet blowing inlet 8 to the pulverization zone 9 to form a circulating air jet current. The powder supplied to the pulverization zone 9 is pulverized by collision of the powder particles themselves to a smaller particle size, and particles pulverized to a volume average particle size of 4 μm or less as shown in FIG. 5(*b*) will depart from the pulverization zone 9 and will be withdrawn from the fine powder outlet 11.

In another method, the porous acrylonitrile-type polymer particles obtained by suspension polymerization and having an average particle size of from 20 to 40 μm as mentioned above are bombarded by means of an jet air against a collision wall for primary pulverization, and the pulverized particles are subjected to precision classification by a classifier by means of a high speed air jet, whereby the acrylonitrile-type polymer particles specified by the present invention are obtainable.

The acrylonitrile-type polymer particles having a volume average particle size of from 1.5 to 4 μm to be used in the present invention are porous polymer particles formed by agglomeration of primary polymer particles having a particle size of from about 0.1 to about 2 μm, preferably from 0.2 to 0.5 μm, as shown in FIG. 5(*b*). Therefore, the dispersibility into a coating composition of the dielectric resin is excellent, and the polymer particles are not susceptible to sedimentation even when left for a long period of time, whereby it is possible to form a dielectric layer having highly uniform properties on the substrate, and the polymer particle will be firmly fixed in the dielectric layer. Further, since the acrylonitrile-type polymer particles to be used in the present invention have a porous structure, the whiteness is excellent, which contributes to the formation of clear electrostatic images.

Figure 6:
FIG. 6 is an enlarged microscopic photograph of an organic powder outside the scope of the present invention.

The acrylonitrile-type polymer to be used for the preparation of the acrylonitrile-type polymer powder to be used in the present invention by the above-mentioned method, is required to have a copolymerized acrylonitrile content of at least 95% by weight. A polymer having a copolymerized acrylonitrile content of at least 95% by weight is capable of being pulverized sufficiently by the above-mentioned pulverization methods. Whereas, when a polymer having a copolymerized acrylonitrile content of less than 95% by weight, e.g. a copolymer of 93% by weight of acrylonitrile and 7% by weight of vinyl acetate, is pulverized by the above-mentioned pulverization methods, a fused layer is likely to be formed on the surface of particles as shown in FIG. 6, whereby it is extremely difficult to obtain a fine powder of the acrylonitrile-type polymer useful for the present invention.

The insulating resin having a volume specific resistance of at least $10^{12}$ Ωcm to be used for carrying out the present invention is preferably the one having excellent blocking resistance with a secondary transition point of the polymer being at least 10° C. It is preferably a homopolymer or copolymer of an acrylate, a methacrylate, styrene, vinyl chloride, vinyl acetate, α-methylstyrene or acrylonitrile, and is preferably a resin soluble or dispersible in a solvent as mentioned hereinafter.

Specifically, there may be mentioned a butyl acrylate/methyl methacrylate copolymer, an isobutyl acrylate/methyl methacrylate/acrylonitrile copolymer, a methyl acrylate/methyl methacrylate copolymer, a butyl acrylate/styrene/acrylonitrile copolymer, and a vinylidene chloride/methyl methacrylate copolymer.

With a dielectric layer made of a resin having a volume specific resistance of less than $10^{12}$ Ωcm, it is difficult to obtain a high degree of dielectric polarization even when an electrostatic charge is applied for electrostatic recording, and it is impossible to form a clear electrostatic image having a high image density and good resolution. Further, these resins are preferably used in the form of an organic solvent solution having a solid concentration of from 5 to 50% by weight in an organic solvent such as toluene, methyl ethyl ketone, methyl isobutyl ketone, acetone, ethanol, ethyl acetate, benzene, isopropanol or xylene, rather than in the form of a solution dissolved or dispersed in an aqueous medium, whereby it is possible to obtain an electrostatic recording material showing a high level of dielectric characteristics and to form a dielectric layer having excellent paper-like properties.

The acrylonitrile-type resin powder is usually incorporated in an amount of from 1 to 100 parts by weight relative to 100 parts by weight of the insulating resin having a volume specific resistance of at least $10^{12}$ Ωcm. If the amount of the acrylonitrile-type resin powder relative to the insulating resin is either excessive or dificient, it is difficult to obtain an electrostatic recording material having satisfactory dielectric characteristics.

The substrate for the electrostatic recording material of the present invention may be a natural paper, synthetic paper or synthetic resin film provided with a layer treated for low electric resistance formed by coating an inorganic salt, an organic salt, a salt of an acidic resin having an acid value of from 50 to 500 or a salt of an amino group-containing resin.

The thickness of the dielectric layer is usually from about 1 to about 10 μm, preferably from about 2 to about 5 μm. If the thickness of the dielectric layer is excessive, it is difficult to obtain a dielectric layer having good charge characteristics, and the paper-like properties and the writability with a pencil or a ball point pen will be impaired.

Now, the present invention will be described in further detail with reference to Examples. However, it should be understood that the present invention is by no means restricted by these specific Examples.

Preparation of an Acrylonitrile-Type Polymer Powder (I)

By an aqueous suspension polymerization method, a porous acrylonitrile-type polymer particles formed by agglomeration of primary polymer particles having a particle size of from 0.1 to 10 μm, comprising 93% by weight of acrylonitrile and 7% by weight of vinyl acetate with a sulfonic acid group content of $2.2\times10^{-5}$ mol/g (polymer) and having an average particle size of 30 μm, were obtained. These acrylonitrile-type polymer particles were pulverized in a pulverizer as shown in FIG. 4 wherein particles are jetted to collide with each other in the pulverization zone, whereby a powder (I) having an average particle size of 6.5 μm was obtained. No further pulverization into a powder having a smaller average particle size was possible. The surface of the powder was fused as shown in FIG. 6.

Preparation of Acrylonitrile-Type Polymer Powders (II) to (XIV)

By an aqueous suspension polymerization method, acrylonitrile was polymerized alone to obtain porous polyacrylonitrile particles formed by agglomeration of primary polymer particles having a particle size of from 0.1 to 2 μm and having a sulfonic acid group content of $1.8\times10^{-5}$ mol/g (polymer) and an average particle size of 35 μm, were obtained. This acrylonitrile-type polymer was pulverized in the pulverizer used in the preparation of the acrylonitrile-type polymer powder (I), whereby various acrylonitrile-type polymer powders (II) to (XIV) having volume average particle sizes as shown in Tables 1 and 2, were prepared.

EXAMPLES 1 to 10 and COMPARATIVE EXAMPLES 1 to 4

50 parts by weight of each of the acrylonitrile-type polymer powders (I) to (XIV) was put into 200 parts by weight of methyl ethyl ketone and dispersed by a stirrer, whereby each acrylonitrile-type polymer powder was dispersed satisfactorily in methyl ethyl ketone, and no formation of agglomerates to agglomeration of powder particles, was observed by examination with naked eye.

14 bottles of a methyl ethyl ketone/toluene solution containing 25% by weight of an acrylic resin obtained by copolymerization of 40 parts by weight of methyl methacrylate and 60 parts by weight of butyl methacrylate, were prepared. The above 14 types of toluene solutions of acrylonitrile polymer powders were added to the 14 bottles, respectively, to obtain 14 types of coating solutions to form dielectric recording layers.

The above 14 types of coating solutions for dielectric recording layers, were coated, respectively, on substrate paper sheets treated by polymer cation treatment and having a thickness of 55 μm, and dried to obtain electrostatic recording materials.

The surface resistivities of these electrostatic recording materials were measured at 20° C. under a relative humidity of 60% at 100 V (DC). The results are shown in Tables 3 and 4.

To these electrostatic recording materials, a negative signal charge was applied by a fixed multi-head with a line density of 8 lines/mm and 16 lines/mm, and development was conducted with a developing powder having a positive charge, to test the electrostatic image-forming properties. The results are shown in Tables 3 and 4.

The evaluation standards for the recording properties in Tables 3 and 4 were as follows:

◎ : No breakage of the image was observed.

○ : No substantial breakage of the image which may impair the recording properties, was observed.

Δ: Breakage of the image was distinctly observed.

X: A number of breakage of the image was observed.

TABLE 1

| Experiment No. | Acrylonitrile-type polymer powder: Type | Sulfonic acid group content (mol/g · polymer) | Volume average particle size (μm) | Particle size distribution (% by number): ≦1 μm | 1 to 4 μm | 4 to 8 μm | 8 μm< | Number of particles exceeding 10 μm (particles/500,000 particles) |
|---|---|---|---|---|---|---|---|---|
| 1 | [II] | $1.8 \times 10^{-5}$ | 2.1 | 23.542 | 75.940 | 0.517 | 0.001 | 0 |
| 2 | [III] | " | 2.4 | 27.513 | 71.353 | 1.132 | 0.002 | 10 |
| 3 | [IV] | " | 2.5 | 18.554 | 80.327 | 1.111 | 0.008 | 15 |
| 4 | [V] | " | 2.6 | 26.097 | 71.993 | 1.900 | 0.012 | 20 |
| 5 | [VI] | " | 2.7 | 31.635 | 66.662 | 1.685 | 0.018 | 25 |
| 6 | [VII] | " | 2.8 | 21.804 | 75.648 | 2.534 | 0.014 | 15 |
| 7 | [VIII] | " | 2.8 | 30.520 | 67.492 | 1.758 | 0.030 | 40 |
| 8 | [IX] | " | 4.4 | 23.062 | 74.302 | 2.517 | 0.119 | 101 |

TABLE 2

| Experiment No. | Acrylonitrile-type polymer powder: Type | Sulfonic acid group content (mol/g · polymer) | Volume average particle size (μm) | Particle size distribution (% by number): ≦1 μm | 1 to 4 μm | 4 to 6 μm | 6 to 8 μm | 8 μm< | Number of particles exceeding 10 μm (particles/500,000 particles |
|---|---|---|---|---|---|---|---|---|---|
| 9 | [X] | $1.8 \times 10^{-5}$ | 3.3 | 22.947 | 75.031 | 1.947 | 0.070 | 0.005 | 2 |
| 10 | [XI] | " | 2.4 | 31.567 | 68.098 | 0.33 | 0.005 | 0.000 | 0 |
| 11 | [XII] | " | 2.9 | 29.486 | 69.792 | 0.676 | 0.038 | 0.008 | 5 |
| 12 | [XIII] | " | 3.3 | 32.187 | 67.010 | 0.702 | 0.072 | 0.029 | 26 |
| 13 | [XIV] | " | 3.3 | 28.827 | 70.023 | 1.074 | 0.058 | 0.018 | 33 |

TABLE 3

| | Type of acrylonitrile-type polymer powder | Surface resistivity | Image properties: Recording properties: 8 lines/mm | 16 lines/mm | Writability | Fogging | Image density |
|---|---|---|---|---|---|---|---|
| Example 1 | [II] | $10^{13}\Omega$ | ○ | ○ | Excellent | Nil | High |
| Example 2 | [III] | " | ○ | ○ | " | " | " |
| Example 3 | [IV] | " | ◎ | ◎ | " | " | " |
| Example 4 | [V] | " | ○ | ○ | " | " | " |
| Example 5 | [VI] | " | ○ | ○ or Δ | " | " | " |
| Example 6 | [VII] | " | ○ | ○ | " | " | " |
| Comparative Example 1 | [VIII] | " | Δ or X | X | Poor | " | " |
| Comparative Example 2 | [IX] | " | X | X | " | Observed | " |
| Comparative Example 3 | [I] | $<10^{11}\Omega$ | X | X | Good | " | Low |

TABLE 4

| | Type of acrylonitrile-type polymer powder | Surface resistivity | Image properties | | | | |
|---|---|---|---|---|---|---|---|
| | | | Recording properties | | | | |
| | | | 8 lines/mm | 16 lines/mm | Writability | Fogging | Image density |
| Example 7 | [X] | $10^{13}\Omega$ | ○ | ○ | Excellent | Nil | High |
| Example 8 | [XI] | " | ◎ | ◎ | " | " | " |
| Example 9 | [XII] | " | ◎ | ○ | " | " | " |
| Example 10 | [XIV] | " | ○ | Δ | " | " | " |
| Comparative Example 4 | [XIII] | " | Δ or X | X | " | " | " |

The electrostatic recording material of the present invention has a dielectric layer comprising an insulating resin having a volume specific resistance of at least $10^{12}$ Ωcm and a powder of an acrylonitrile-type polymer having a copolymerized acrylonitrile content of at least 95% by weight and containing substantially no ionic groups, said powder being porous particles formed by agglomeration of primary polymer particles having a particle size of from 0.1 to 2 μm and having a volume average particle size of from 1.5 to 4 μm and a content of particles having a particle size exceeding 8 μm, particularly 6 μm, being at most 0.02% by number, whereby the dielectric recording layer can be highly charged when an electrostatic recording charge with an extremely high recording density at a level of at least 8 dots/mm, particularly 16 dots/mm, is applied, and it is possible to form a clear electrostatic recording image having high resolution and high image density by treatment with a toner.

What is claimed is:

1. An electrostatic recording material comprising a substrate treated for low electric resistance and a dielectric layer formed on the substrate and composed of a composition comprising an insulating resin having a volume specific resistance of at least $10^{12}$ Ωcm and a powder of a homopolymer or a copolymer of acrylonitrile, containing substantially no ionic groups, which is a polymer of a monomer or a monomer mixture containing at least 95% by weight of acrylonitrile said powder having a volume average particle size of from 1.5 to 4 μm and a content of particles having a size exceeding 8 μm as measured by a particle size distribution measuring apparatus, being at most 0.02% by number.

2. The electrostatic recording material according to claim 1, wherein the homopolymer or the copolymer of acrylonitrile powder is formed by agglomeration of particles having a particle size of from 0.1 to 2 μm.

3. The electrostatic recording material according to claim 1, wherein the homopolymer or the copolymer of acrylonitrile powder is composed of porous particles.

4. The electrostatic recording material according to claim 2, wherein the homopolymer or the copolymer of acrylonitrile powder is composed of porous particles.

5. The electrostatic recording material according to claim 1, wherein the homopolymer or the copolymer of acrylonitrile powder has a content of particles having a size exceeding 6 μm as measured by a particle size distribution measuring apparatus, being at most 0.02% by number.

6. The electrostatic recording material according t claim 1, wherein the homopolymer or the copolymer of acrylonitrile powder has a content of particles having a particle size exceeding 10 μm as measured by a particle size distribution measuring apparatus, being at most 30 particles per 500,000 particles counted.

7. The electrostatic recording material according to claim 2, wherein the homopolymer or the copolymer of acrylonitrile powder has a content of particles having a particle size exceeding 10 μm as measured by a particle size distribution measuring apparatus, being at most 30 particles per 500,000 particles counted.

8. The electrostatic recording material according to claim 3, wherein the homopolymer or the copolymer of acrylonitrile powder has a content of particles having a particle size exceeding 10 μm as measured by a particle size distribution measuring apparatus, being at most 30 particles per 500,000 particles counted.

9. The electrostatic recording material according to claim 4, wherein the homopolymer or the copolymer of acrylonitrile powder has a content of particles having a particle size exceeding 10 μm as measured by a particle size distribution measuring apparatus, being at most 30 particles per 500,000 particles counted.

10. The electrostatic recording material according to claim 5, wherein the homopolymer or the copolymer of acrylonitrile powder has a content of particles having a particle size exceeding 10 μm as measured by a particle size distribution measuring apparatus, being at most 30 particles per 500,000 particles counted.

11. The electrostatic recording material according to claim 1, which has a recording density of at least 8 dots/mm.

12. The electrostatic recording material according to claim 1, wherein the homopolymer or the copolymer of acrylonitrile has a reduced viscosity of from 1 to 8 calculated by measuring the viscosity of a dimethylformamide solution having a polymer concentration of 0.5% by weight at 25° C.

13. The electrostatic recording material according to claim 12, wherein the homopolymer or the copolymer of acrylonitrile contains at most $5\times10^{-5}$ mol/g (polymer) of ionic groups.

14. The electrostatic recording material according to claim 13, wherein the homopolymer or the copolymer of acrylonitrile contains at most $2\times10^{-5}$ mol/g (polymer) of ionic groups.

* * * * *